United States Patent [19]

Hamane et al.

[11] Patent Number: 4,564,081
[45] Date of Patent: Jan. 14, 1986

[54] MOTORCYCLE COOLING SYSTEM

[75] Inventors: Masumi Hamane; Takanori Onda; Masayoshi Baba, all of Saitama, Japan

[73] Assignee: Honda Giken Kogyo Kabushiki Kaisha, Tokyo, Japan

[21] Appl. No.: 530,994

[22] Filed: Sep. 9, 1983

[30] Foreign Application Priority Data

Sep. 11, 1982 [JP] Japan .................................. 57-158382

[51] Int. Cl.⁴ ........................................... B60K 11/04
[52] U.S. Cl. .................. 180/229; 180/68.1; 280/289 A
[58] Field of Search .............. 180/229, 219, 225, 226, 180/228, 230, 68.1; 280/289 A; 165/41, 44, 51, 53, 54

[56] References Cited

U.S. PATENT DOCUMENTS 4,171,729  10/1979  Shibata .............................. 180/229

FOREIGN PATENT DOCUMENTS

| 0021657 | 1/1981 | European Pat. Off. |
| 1077820 | 11/1954 | France. |
| 141194 | 4/1920 | United Kingdom ................ 180/229 |
| 1513134 | 6/1978 | United Kingdom. |
| 1537233 | 12/1978 | United Kingdom ........... 280/289 A |

OTHER PUBLICATIONS

Yamaguchi, 372 Automotive Engineering vol. 91, No. 5, (May 1983).

*Primary Examiner*—John A. Pekar
*Attorney, Agent, or Firm*—Lyon & Lyon

[57] ABSTRACT

Motorcycles of the type having front leg shields, step floors and rear mounted engines have water-cooled engines with radiators mounted at the front leg shield. Tubes connecting the radiator with the water-cooled engine extend below the step floor. In certain of the embodiments, a trunk is illustrated within which the filler cap and the radiator tank are positioned for easy access. The trunk may be mounted above and spaced from the front fender to define a passage for frontal air to be directed to the front mounted radiator.

8 Claims, 15 Drawing Figures

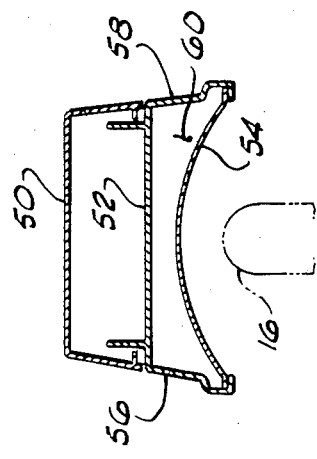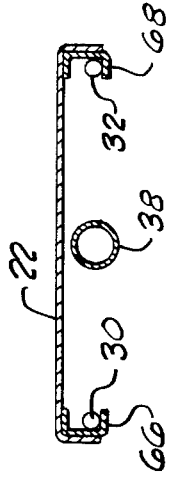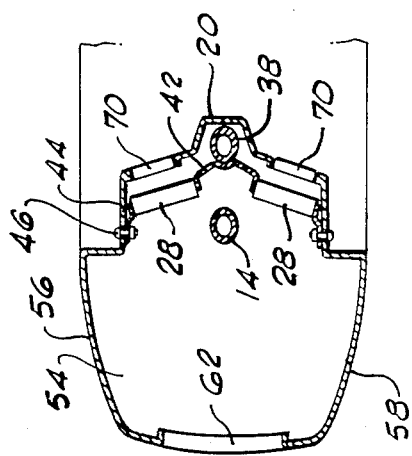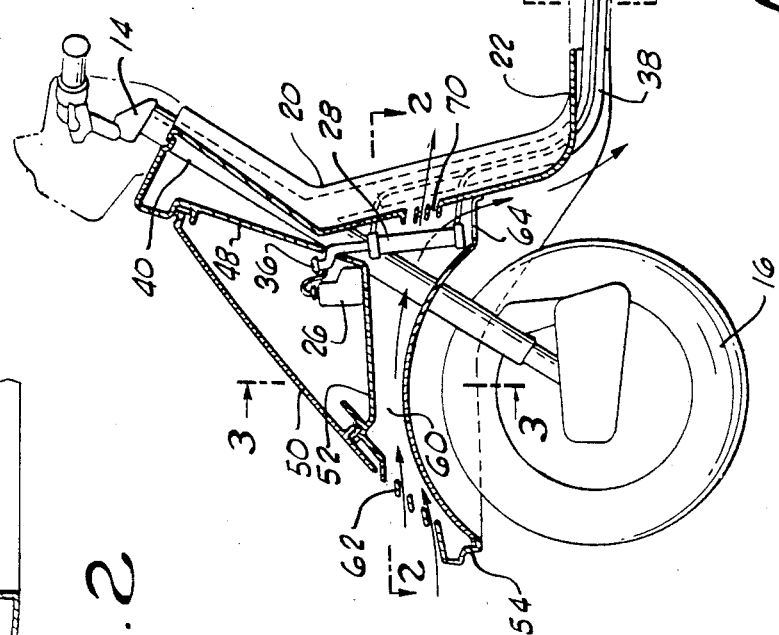

4,564,081

MOTORCYCLE COOLING SYSTEM

BACKGROUND OF THE INVENTION

The field of the present invention is water cooling systems for motorcycle engines.

Motorcycles and particularly smaller motorcycles such as motor scooters have typically employed air-cooled engines. Air-cooled engines are lighter in weight and require less space than water-cooled systems. With water cooling, a radiator is required along with a water jacket on the engine and tubing connecting the two. These features add both weight and require additional space. Cooling fluid also adds weight to the system. Furthermore, the radiator must be located in an area of the vehicle experiencing air flow during forward motion. Consequently, special ducting and additional space may be needed to realize proper radiator efficiency.

On smaller motorcycles, compact design is important to aesthetic appearance as well as low wind resistance, reduction in weight and space allocation for other components. Weight and weight distribution of components is also important for performance efficiency and handling. In smaller motorcycles, added components can affect weight distribution and overall weight disproportionately because of an initial low weight. Accordingly, water-cooled systems have heretofore been disfavored in small motorcycle design in spite of the advantages of greater cooling efficiency, improved combustion control and the like.

SUMMARY OF THE INVENTION

The present invention pertains to the arrangement of a water cooling system for a motorcycle engine. The invention is particularly applicable to motorcycles of the type having a front leg shield, a step floor and a rear mounted engine. A radiator is positioned at the front leg shield with tubing connecting the radiator with the water jacket of the engine. In one aspect of the present invention, the tubing connecting the radiator and the water jacket of the engine is advantageously located below the step floor of the vehicle. In another aspect of the present invention, provision is made for air flow ducting to the advantageously mounted radiator between a compartment located forwardly of the leg shield and the front wheel fender.

The arrangement employing a front mounted radiator with the rear mounted engine provides advantageous weight distribution. Additionally, the heat exhausted from the radiator is not distributed into the engine compartment. The heat may in fact be selectively distributed to the rider at the rider's option. The advantageous location of the connecting tubes between the radiator and the water jacket of the engine affords protection to the system and avoids aesthetically displeasing conduits running the length of the vehicle. The presence of an air passage between the forwardly mounted compartment or trunk and the front fender allows control of air flow to the radiator for maximum efficiency and protects the radiator from damage from air borne objects, the elements or minor impact. Additionally, the dual use of certain body elements on the motorcycle to define the air passage aids in the achievement of a compact, lightweight design.

Accordingly, it is an object the present invention to provide an improved water cooling system for motorcycles, having particular advantage for smaller motorcycles such as motor scooters. Other and further objects and advantages will appear hereinafter.

BRIEF DESCRIPTION OF THE DRAWINGS

FIG. 1 is an elevation partially in cross section illustrating a motorcycle incorporating the present invention.

FIG. 2 is a cross-sectional plan view taken along line 2—2 of FIG. 1.

FIG. 3 is a cross-sectional end view taken along line 3—3 of FIG. 1.

FIG. 4 is a cross-sectional end view taken along line 4—4 of FIG. 1.

DETAILED DESCRIPTION OF THE PREFERRED EMBODIMENT

Figure 5A:
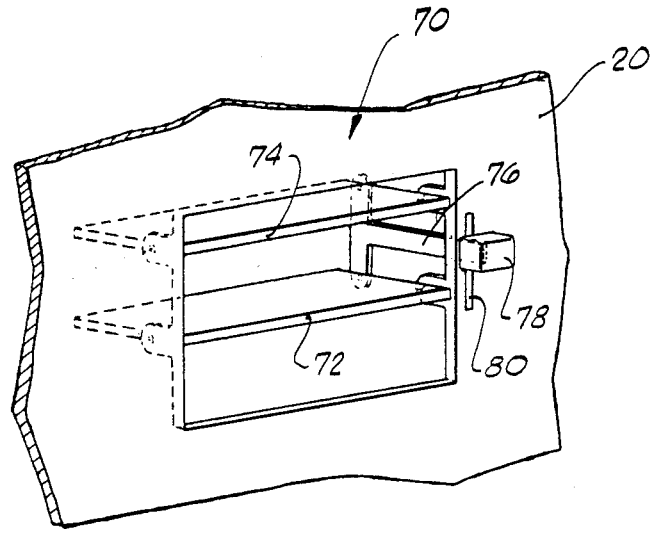
FIGS. 5A and 5B illustrate in perspective and side view, respectively, a closable vent which may be incorporated with the device of the present invention.

Turning in detail to the drawings, and particularly the embodiment of FIGS. 1–4, a motorcycle is illustrated of the motor scooter type having a main body 10, a seat 12, a front steering and handlebar assembly 14 and front and rear wheels 16 and 18. A front leg shield 20 extends upwardly to meet with the steering assembly 14 from a step floor 22. The step floor 22 extends rearwardly to the main body 10. Behind the step floor 22 is an engine and drive train assembly 24.

A water cooling system for the engine includes a radiator tank 26, a radiator 28, tubes 30 and 32 extending between the radiator 28 and the cooling jacket of the engine 24 and a water pump 34. The radiator 28 is mounted at the front leg shield 20 and the tubes extend downwardly adjacent the front leg shield 20, beneath the step floor 22 and then to appropriate locations on the engine 24. The radiator tank 26 is mounted adjacent the filler cap 36 for convenient communication therebetween. As can be seen in FIG. 2, the radiator 28 is divided into two components providing balance about a symmetrical centerline of the vehicle as well as adequate radiator capacity.

The location of the radiator 28 at the front leg shield 20 places the radiator 28 in a forward location for receiving frontal air flow. The distribution of weight is enhanced by moving certain, heavier components forward away from the engine 24. The direction of the tubes 30 and 32 downwardly and beneath the step floor 22 provides protection for the tubes 30 and 32 and removes them from the aesthetic appearance of the vehicle.

The arrangement of structural and body components at the front of the motorcycle is illustrated with the device of FIG. 1 in partial cross section and in greater detail in cross-sectional views 2, 3 and 4. A down tube 38 extends downwardly from a head pipe 40 associated with the steering assembly 14. The down tube 38 then extends rearwardly beneath the step floor 22 to meet with the frame structure at the rear of the vehicle. The steering assembly 14 extends downwardly to support the vehicle on the front wheel 16. The radiator components 28 are mounted on either side of the down tube 38 and the steering assembly 14 as best seen in FIG. 2. Brackets 42 and 44 retain each element of the radiator 28 in position at the front leg shield 20 in conjunction with fasteners 46.

A trunk or compartment 48 is formed of sheet material forwardly of the front leg shield 20. The compartment includes a cover 50 enclosing the cavity and providing a smooth frontal appearance to the vehicle. The compartment 48 includes a lower wall 52 forming the bottom of the compartment.

Below the compartment 48 is a front fender 54. The front fender 54 is spaced below the bottom wall 52 of the compartment 48 and is substantially broader than the wheel 16. The fender extends rearwardly to the front leg shield 20 as can best be seen in FIG. 1. Sidewalls 56 and 58 are formed, as can be seen in FIG. 3, as part of the bottom wall 52 of the compartment 48. The sidewalls 56 and 58 extend downwardly to the fender 54.

Defined between the sidewalls 56 and 58 and between the bottom wall 52 of the compartment 48 and the front fender 54 is an air passage 60. Through formation of this passage by these elements, the elements of the radiator 28 are shown to be located in the passage to receive air flow as indicated by the arrows in FIG. 1. A louvered opening 62 between the converging sidewalls 56 and 58 admits air to the passage 60 from the front of the vehicle to maximize employment of frontal air flow. A space exists between the elements of the radiator 28 and the front leg shield 20 in order that flow through the radiator elements 28 may continue downwardly between the radiator elements 28 and the leg shield 20 for discharge beneath the vehicle. An outlet 64 through the rearwardly extending fender 54 accommodates this flow.

Conveniently extending into the trunk 48 is the filler cap 36 connected to one of the radiator elements 28. Also located within the compartment 48 is the radiator tank 26 associated with the filler cap assembly. Thus, through simple removal of the cover 50, access to normally service the radiator is facilitated.

FIG. 4 specifically illustrates one possible embodiment of the present invention for location of the radiator tubes 30 and 32. Channel members 66 and 68 form a portion of the vehicle structure and provide protected and convenient location for the tubes 30 and 32. The down tube 38 is shown to run centrally beneath the step floor 22 between the channel 66 and 68.

Figure 5B:
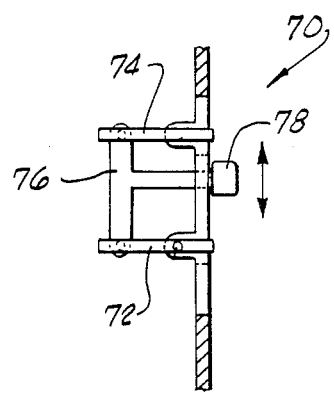

Located in the front leg shield 20 are two selectively closable vents 70. As can be seen by the arrow in FIG. 1, when open, the vents 70 allow air exhausted from the radiator elements 28 to flow into the relatively quiescent area behind the front leg shield 20. This provides some heat to the rider of the vehicle. Alternate embodiments are illustrated in FIGS. 5 and 6 of the vent 70. In the device of FIGS. 5A and 5B, pivotally mounted vent plates 72 and 74 are constrained to move with a lever 76 actuated by a knob 78 extending through a slot 80 in the front leg shield 20. By moving the knob up and down, the plates 72 and 74 may be opened or closed at the rider's selection.

Figure 6A:
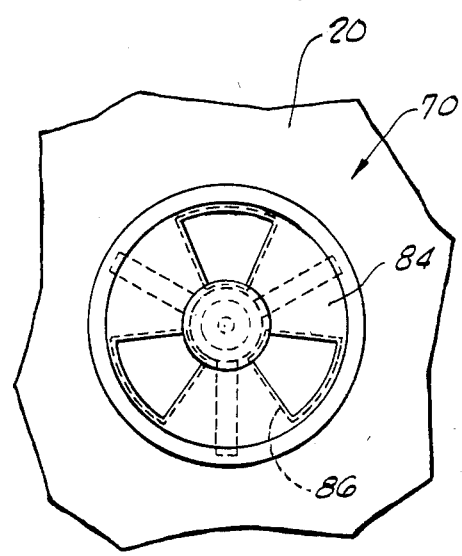
FIGS. 6A and 6B illustrate in front view and side view, respectively, another closable vent which may be incorporated with the device of the present invention.
Figure 6B:
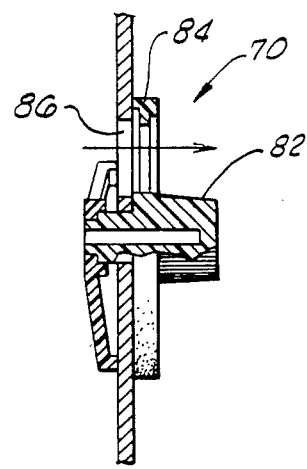

In FIGS. 6A and 6B, a rotary damper arrangement is illustrated as including a control knob 82 controlling a circular vent plate 84 to selectively open or close vent passages 86.

Figure 7A:
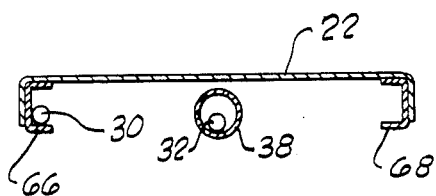
FIGS. 7A, 7B and 7C illustrate optional embodiments in cross section taken along line 4—4 of FIG. 1.
Figure 7B:
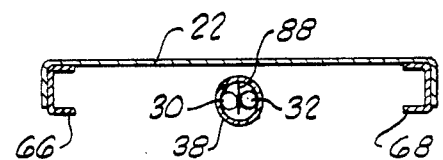
Figure 7C:
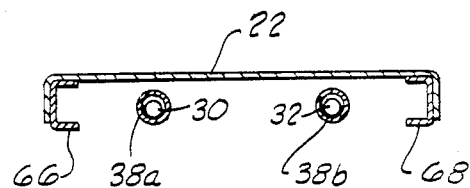

FIGS. 7A, 7B and 7C illustrate optional configurations to that of the configuration best illustrated in FIG. 4 of the first embodiment. Corresponding numerals indicate elements of similar function. In the embodiment of FIG. 7A, one of the tubes, tube 32, is located within the rearwardly extending portion of the down tube 38. In FIG. 7B, both tubes 30 and 32 are so arranged with a heat insulator 88 extending between the tubes. In FIG. 7C, the downtube 38 has been divided into two tubes 38A and 38B with a cooling tube 30 and 32 located in each of the elements 38A and 38B of the down tube structure.

Figure 8:
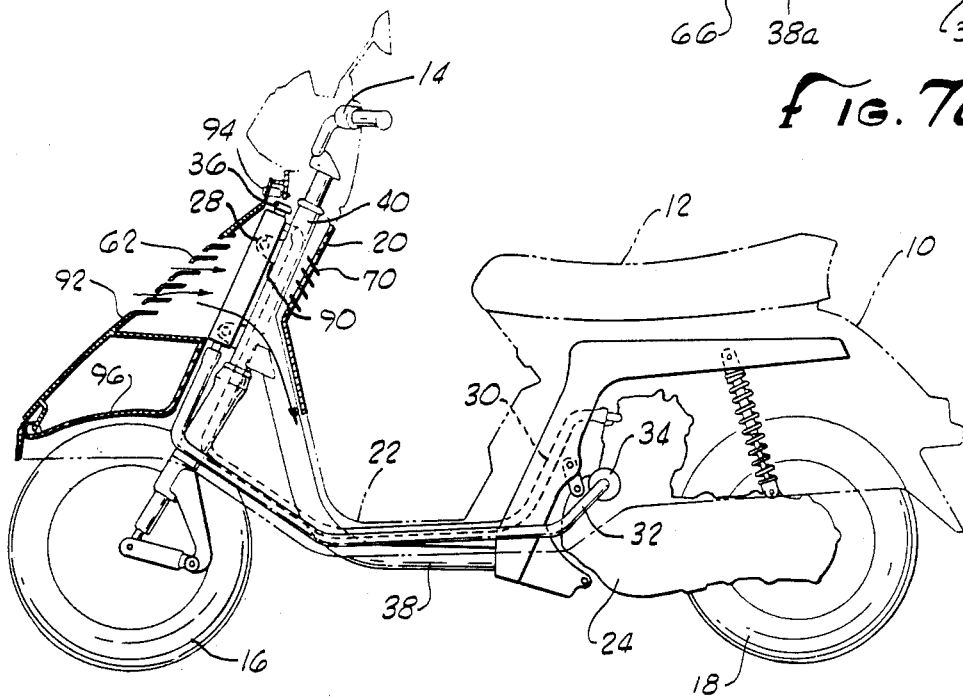
FIG. 8 is a side view partially in cross section illustrating another embodiment of the present invention.
Figure 9:
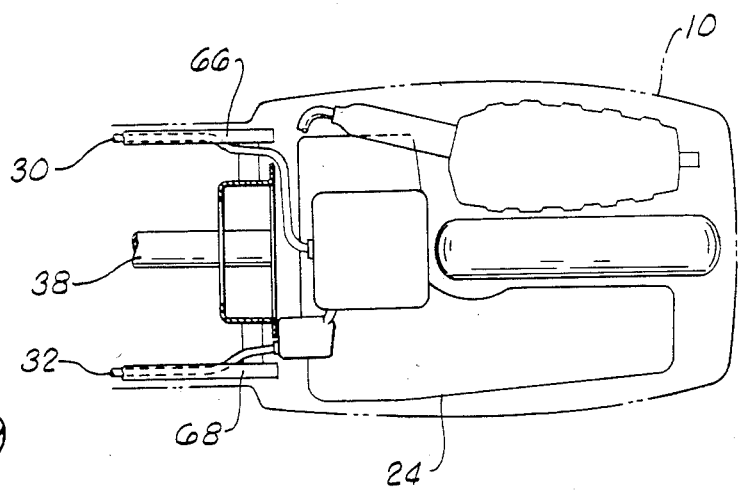
FIG. 9 is a plan view of a portion of the mechanism of the motorcycle of FIG. 8.
Figure 10:
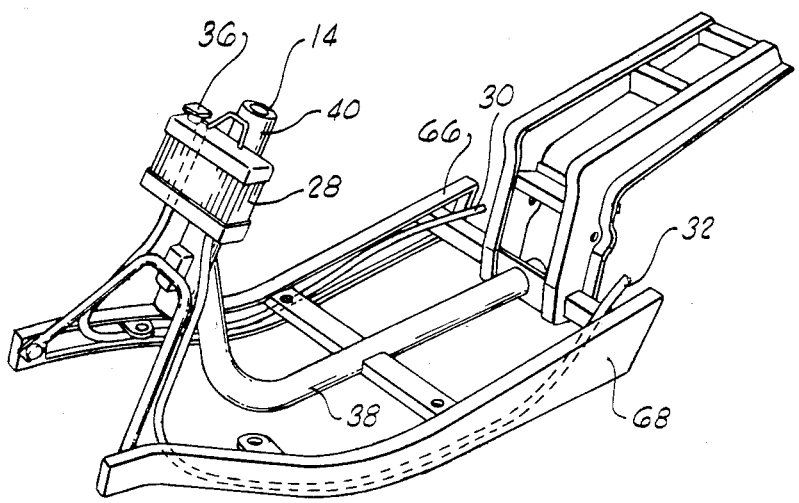
FIG. 10 is an oblique view of the body frame of the motorcycle of FIG. 8.

Looking to another motorcycle embodiment as illustrated in FIGS. 8, 9 and 10, corresponding numerals to that of the figures discussed earlier are employed for corresponding elements. The radiator 28 is located in the upper part of the frontal area of the vehicle as can best be seen in FIG. 8. The radiator 28 is specifically mounted by means of brackets 90 to the head pipe 40. The front leg shield 20 extends across the motorcycle behind the head pipe 40. A front cover 92 is removably positioned across the front of the vehicle and held in place by a latch 94. A louvered vent 62 allows frontal air flow through the cover 92 to be directed at the radiator 28. As indicated by the arrow in FIG. 8, air flow through the radiator is then exhausted downwardly in front of the front leg shield generally toward the underside of the vehicle. A compartment 96 is also enclosed by the cover 92. Closable vents 70 allow heated air to be selectively directed to the rider.

Figure 11:
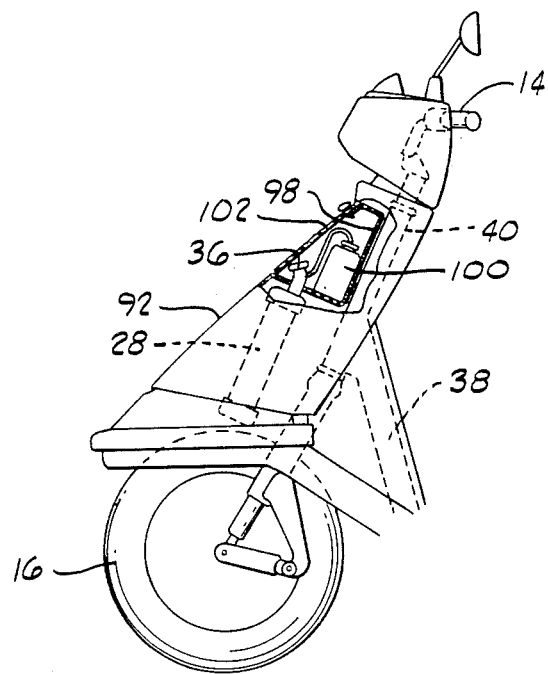
FIG. 11 is a side elevation of yet a further embodiment of a motorcycle of the present invention.

Looking to the additional embodiment of FIG. 11, once again, similar numerals are incorporated to denote corresponding elements with prior described embodiments. In this embodiment of FIG. 11, an additional compartment is defined by means of a back wall 98 in which is located the filler cap 36 of the radiator 28 and radiator tank 100. A separate cover 102 may be employed to provide direct access to the small compartment and to the filler cap 36 and tank 100. In the position shown, the radiator 28 is located above the front wheel 16 and forwardly of the head pipe 40. Louvers (not shown) through the cover 92 receive frontal flow for direction to the radiator 28.

Thus, a plurality of embodiments are disclosed illustrating an improved water cooling system for motorcycles of the type having a front leg shield and a rear mounted engine. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle having a front leg shield, a step floor and an engine mounted behind the step floor, comprising
   a trunk mounted in front of the front leg shield;
   a fender below said trunk;
   a passage between said trunk and said fender;
   a radiator mounted in said passage; and
   tubes extending from said radiator to the engine.

2. The motorcycle of claim 1 further comprising a filler cap on said radiator, said filler cap being located in said trunk.

3. A motorcycle having a front leg shield, a step floor and an engine mounted behind the step floor, comprising
    a radiator mounted at the front leg shield;
    tubes extending from said radiator, below the step floor and to the engine;
    side channels supporting the step floor, said tubes being positioned to extend beneath the step floor in said side channels.

4. A motorcycle having a front leg shield, a step floor and an engine mounted behind the step floor, comprising
    a radiator mounted at the front leg shield;
    tubes extending from said radiator, below the step floor and to the engine;
    a downtube extending rearwardly beneath the step floor, at least one of said tubes extending beneath the step floor in said downtube.

5. The motorcycle of claim 4 wherein there are two said tubes, both said tubes extending beneath the step floor in said down tube.

6. The motorcycle of claim 5 further comprising a heat insulator between said tubes and the down tube.

7. The motorcycle of claim 4 wherein said down tube includes parallel elements, one of said tubes extending beneath the step floor in each of the down tube elements.

8. A motorcycle having a front leg shield, a step floor and an engine mounted behind the step floor, comprising
    a radiator mounted at the front leg shield;
    tubes extending from said radiator, below the step floor and to the engine;
    a downtube extending downwardly from the front leg shield and rearwardly beneath the step floor, said radiator being mounted to said downtube at the front leg shield.

* * * * *